United States Patent
Yamauchi (10) Patent No.: US 6,459,028 B2
(45) Date of Patent: Oct. 1, 2002

(54) PERFORMANCE DATA MODIFYING METHOD, PERFORMANCE DATA MODIFYING APPARATUS, AND STORAGE MEDIUM

(75) Inventor: Akira Yamauchi, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 09/812,290

(22) Filed: Mar. 20, 2001

(30) Foreign Application Priority Data

Mar. 21, 2000 (JP) ........................................ 2000-079148

(51) Int. Cl.⁷ .............................................. G09B 15/02
(52) U.S. Cl. ...................... 84/477 R; 84/478; 84/483.1; 84/483.2
(58) Field of Search .............................. 84/600, 470 R, 84/477 R, 478, 483.1, 483.2, 484

(56) References Cited

U.S. PATENT DOCUMENTS 6,137,041 A * 10/2000 Nakano .................... 84/470 R
6,235,979 B1 * 5/2001 Yanase ...................... 84/477 R
6,281,420 B1 * 8/2001 Suzuki et al. ............. 84/477 R

* cited by examiner

*Primary Examiner*—Marlon T. Fletcher
(74) *Attorney, Agent, or Firm*—Morrison & Foerster LLP (57) ABSTRACT

An application program for generating performance data of a user input musical score performs a modifying process of modifying only a note with a musical sign such as a turn sign, so that as the generated performance data is reproduced, unnatural musical sounds are generated. For example, as a player uses a turn rendering with an acoustic piano or the like, there is a tendency that a key depression force for a note just after the turn rendering also becomes weak. With conventional techniques, however, this state cannot be automatically realized. In order to generate performance data whose notes are coupled naturally, output performance data is first generated at Steps SP10 or SP18 for a note (subject note) with a turn sign. Then, a velocity of performance data for a note (related note) positioned immediately after the subject note is weakened at Step SP12 or SP20.

19 Claims, 5 Drawing Sheets

PERFORMANCE DATA MODIFYING METHOD, PERFORMANCE DATA MODIFYING APPARATUS, AND STORAGE MEDIUM

This application is based on Japanese Patent Application 2000-079148, filed on Mar. 21, 2000, the entire contents of which are incorporated herein by reference.

BACKGROUND OF THE INVENTION a) FIELD OF THE INVENTION

The present invention relates to a data modifying method, a data modifying apparatus, and a storage medium, to be used with an electronic musical instrument or the like for generating performance data corresponding to an input musical score.

b) DESCRIPTION OF THE RELATED ART

An application program such as a desk-top music program running on a personal computer is known which generates performance data corresponding to a musical score input by a user. Various musical signs (such as arpeggio, trill and glissando) can be added to notes of a score. In this case, performance data modified by musical signs is generated.

Of musical signs, a "turn sign" is used for modifying a melody line such as, for example, "original tone"→"upper adjacent tone"→"original tone"→"lower adjacent tone"→"original tone". Five note events are generated for the note added with this turn sign. As a player uses a turn rendering with an acoustic piano or the like, a key depression force per one depression becomes weaker than other tones. In order to simulate this, a velocity lower than an ordinary tone is given to the note event generated in response to a turn sign.

With a conventional application program, however, only a note added with a musical sign is modified so that as the generated performance data is reproduced, unnatural musical sounds are generated. For example, as a player uses a turn rendering with an acoustic piano or the like, there is a tendency that a key depression force for a note just after the turn rendering also becomes weak. With conventional techniques, however, a note-on event having an ordinary velocity is generated for the note just after the note added with the turn sign so that sounds of the note are listened too strong.

SUMMARY OF THE INVENTION

It is an object of the present invention to provide a performance data modifying method, a performance data modifying apparatus, and a storage medium, capable of automatically generating performance data whose notes are coupled in a natural continuous way.

According to one aspect of the present invention, there is provided a performance data modifying method of modifying performance data generated from the contents of a musical score, comprising: a first inserting step of adding a musical sign to a first note in the score or inserting a first note added with a musical sign into the score; and a modifying step of modifying performance data for the first note and a second note positioned before or after the first note in the score, in accordance with the musical sign.

As above, performance data of not only a first note added with a musical sign but also a second note just before or after the first note in a score is modified in accordance the musical sign. It is therefore possible to automatically generate performance data whose notes are coupled in a natural continuous way.

DETAILED DESCRIPTION OF THE PREFERRED EMBODIMENTS

Figure 1:
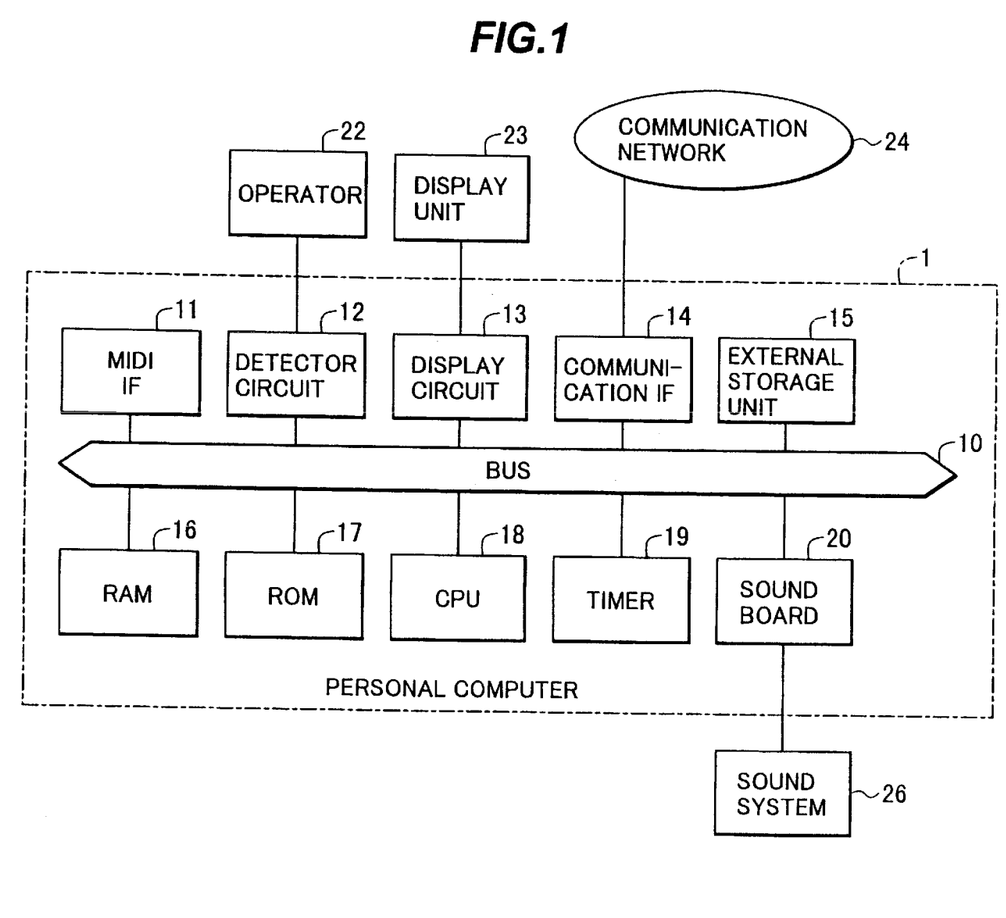
FIG. 1 is a block diagram showing the structure of a performance data editing apparatus according to an embodiment of the invention.

With reference to FIG. 1, an embodiment of the invention will be described. In this embodiment, a performance data editing apparatus is realized by using a personal computer.

A CPU 18 in a personal computer 1 controls each circuit portion of the computer 1 via a bus 10 by using a control program to be described later.

A MIDI interface 11 transfers a MIDI signal to and from an external MIDI instrument. An operator 22 such as a keyboard and a mouse inputs various operation data to CPU 18 via a detector circuit 12. A display unit 23 is driven by a display circuit 13 and displays various information to a user. A communication interface 14 transfers various information to and from a communication network 24 such as the Internet. An external storage device 15 such as a floppy disc drive, a hard disc drive, a CD-ROM drive, and an MO drive stores therein an operating system, application programs, performance data, and various display information. The application programs include a score editing program, a performance data editing and modifying program, an automatic performance program and the like.

A ROM 17 stores an initial program loader and the like for starting up the operating system of the personal computer 1. Data can be read from or written in a RAM 16 by CPU 18. A timer 19 is used for issuing a timer interrupt to CPU 18 at a predetermined time interval. A sound board 20 generates tone signals in accordance with performance data (output performance data) generated by CPU 18. A sound system 26 is used for reproducing sounds corresponding to tone signals output from the sound board 20.

The operating system, application programs and the like stored in a hard disc of the hard disc drive or the like are read into RAM 16 and executed by CPU 18 when necessary. With this arrangement, addition, version-up or the like of the control programs can therefore be performed easily. A CD-ROM (compact disc—read only memory) drive reads the control program and various data stored in a CD-ROM. The read control program and various data are stored in a hard disc of the hard disc drive. New installation, version-up or the like of the control program can therefore be performed easily.

Next, the data structure used in this embodiment will be described.

This embodiment uses three types of data, "score display data", "reference data" and "output performance data". The "score display data" is used for displaying a score and set so as to make it easy to grasp a correspondence between each note and each musical sign. The "output performance data" is used for a real sound reproduction process and set so as to make it easy to grasp a correspondence between each sound to be reproduced and each of output performance data.

Figure 2A:
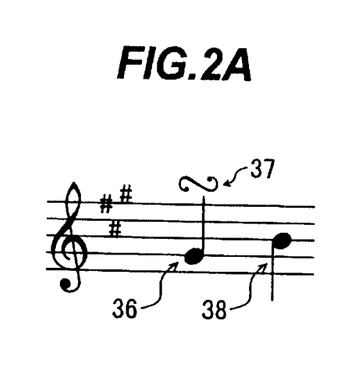
FIGS. 2A and 2B are diagrams showing a score and the structure of score display data.
Figure 2B:
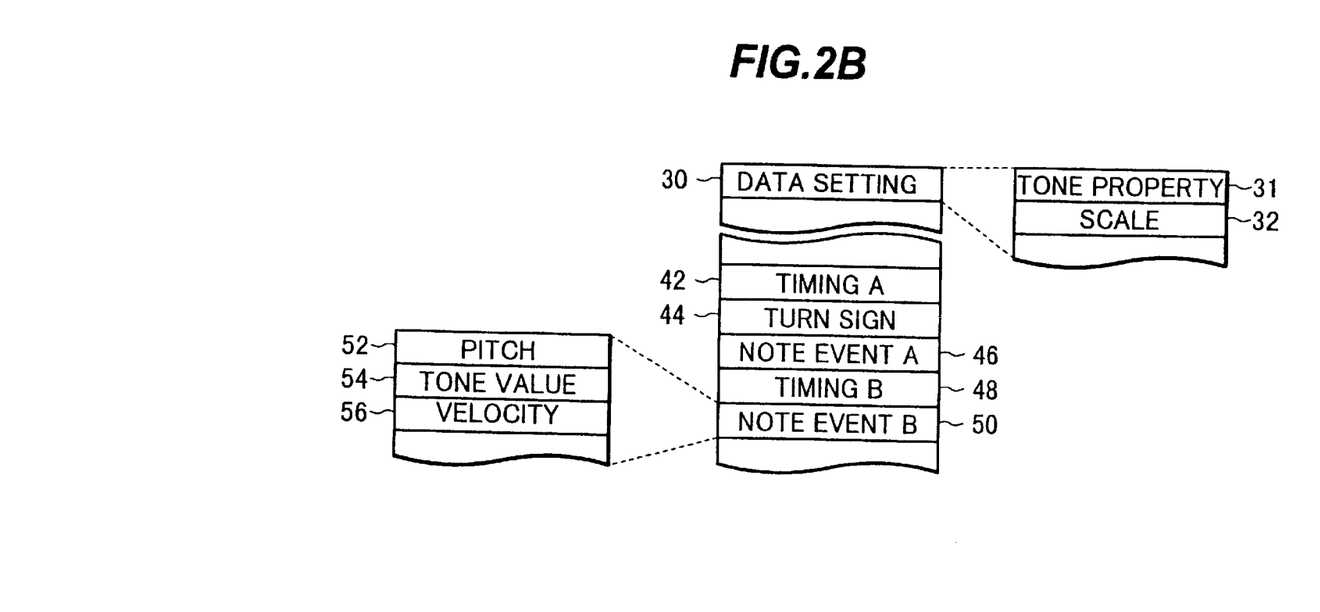

FIG. 2A shows an example of a score, and FIG. 2B shows the structure of the score display data.

The score shown in FIG. 2A is the key of A major and contains quarter notes 36 and 38 of G4# and B4. A turn sign 37 is added to the quarter note 36 of G4#. In FIG. 2B, a data setting field 30 stores default setting data of a score and includes a tone property designating field 31 for designating a tone property of tones in a score (e.g., a program number of MIDI data), a scale designating field 32 for designating a scale (in this example, a scale in the key of A major). In accordance with the contents in the scale designating field 32, the number and positions of sharp and flat sign displayed at the start of the score are determined. Although not specifically shown, the data setting field 30 also stores tempo data, rhythm data and the like.

Each of timing fields 42, 48, . . . stores the display position on the score of a succeeding note event. This display position corresponds to a performance position along a time axis during performance. Note event fields 46 and 50 store the data corresponding to the quarter notes 36 and 38. For example, the note event field 50 stores pitch data 52, tone value data 54, velocity data 56 representative of a key depression force (sound volume) and the like. The note event field 46 stores similar data. In this embodiment, if a note is added with a musical sign, the musical sign data is inserted just before the note event field. In the example shown in FIG. 2B, musical sign data 44 representative of a turn sign 37 is inserted just before the note event field 46 corresponding to the quarter tone 36.

Next, the structure of reference data will be described with reference to FIG. 4.

Figure 4:
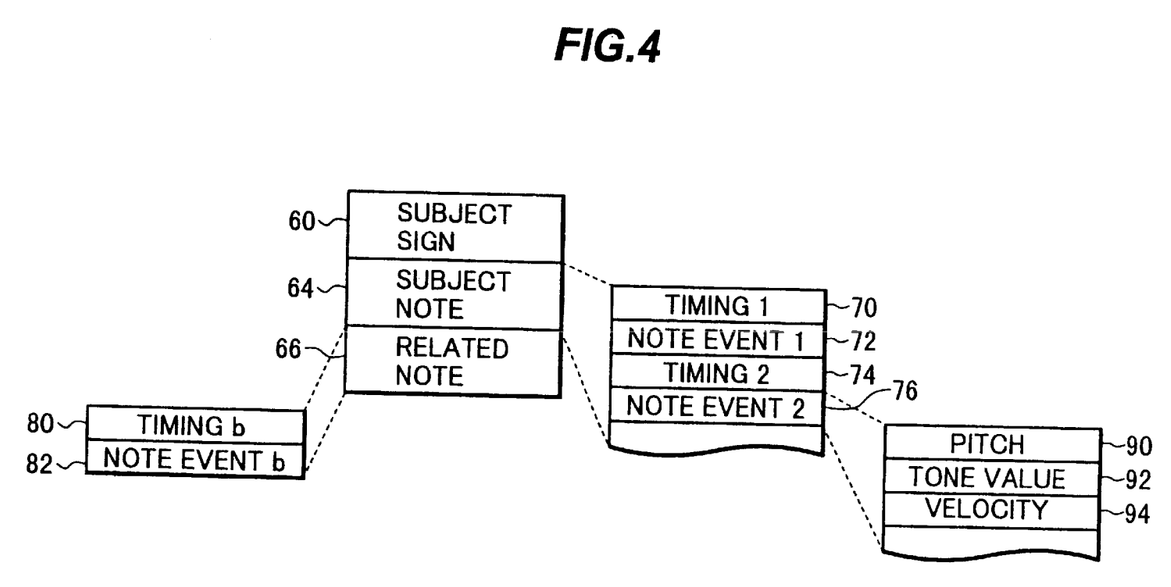
FIG. 4 is a diagram showing the structure of reference data.

In FIG. 4, a subject sign field 60 stores data for identifying a sign (e.g., turn sign) in the reference data. A subject note field 64 stores performance data to be generated when the sign is added to some "representative note". In this embodiment, a "quarter note at a pitch of C4 in the key of C major" is used as the representative note.

In the example shown in FIG. 4, the subject note field 64 includes: note event fields 72, 76, . . . whose events are generated in accordance with the sign and representative note; and timing data fields 70, 74, . . . for indicating timings when these note events are executed. Each of the note event fields 72, 76, . . . stores pitch data 90, tone value data 92, velocity data 94 and the like. For example, the reference data for the turn sign contains note event data at pitches "C4, D4, C4, B3 and C4" for the representative note (quarter note at pitch of C4 in the key of C major) and five timing data sets inserted before the respective note event fields.

A related note field 66 stores data of a note related to the representative note (in this example, note immediately after the representative note). The related note data field 66 stores: timing data 80 indicating a lapse time after all the note events related to the representative note are completed; and note event data 82.

Similar to the note event data 72, 76, . . . , the note event data 82 includes pitch data, tone value data, velocity data and the like.

Of these data, the data unnecessary to be defined uses invalid data (e.g., null data). In the related note field 66 for the turn sign, invalid data is stored in the whole field, excepting the "velocity". The velocity data is set slightly higher than that in the note event fields 72, 76, . . . and slightly lower than that of an ordinary note.

Next, output performance data corresponding to the score shown in FIG. 2A will be described with reference to FIG. 5.

Figure 5:
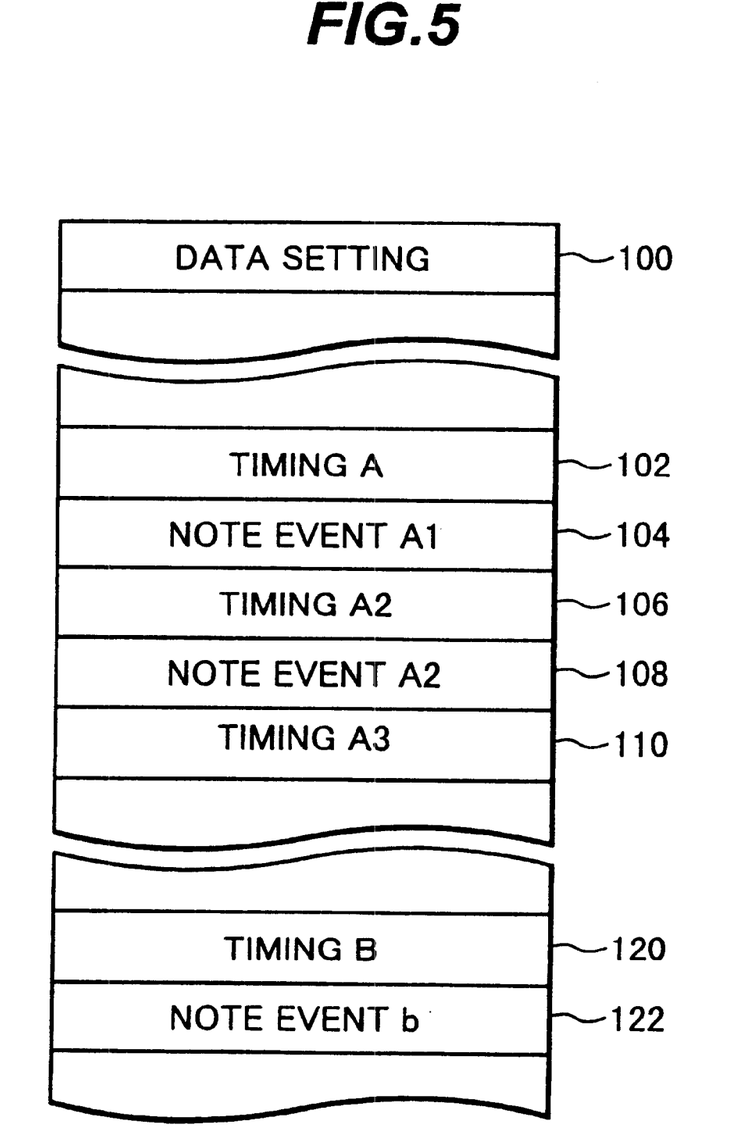
FIG. 5 is a diagram showing the structure of performance data.

In FIG. 5, data in the data setting field 100 is the same as the contents in the data setting field 30 shown in FIG. 2B. Timing data 102 is the same as the contents, for example, in the timing data field 42. Timing data fields 106, 110, . . . are inserted immediately before note event data fields 104, 108, . . . The contents corresponding to the quarter note 36 and turn sign 37 are stored in these fields. Timing data 120 is the same as the contents, for example, in the timing data field 48.

A note event data field 122 stores the contents corresponding to the quarter note 38. The detailed contents of the output performance data will be later described.

Next, the operation of this embodiment will be described.

As the power of the personal computer 1 is turned on, the initial program loader stored in ROM 17 is executed so that the operating system starts up. Under this operating system, as a user performs a predetermined operation, the application program of this embodiment is initiated.

Under this application program, as the user performs a predetermined operation, a score editing program is initiated. This program displays a score on the display unit 23. The user can adds notes, rests, and other various musical signs to this score by manipulating the operator 22. As the user edits the score on the display unit 23, score display data in RAM 16 is updated. In this manner, as the user inputs the quarter notes 36 and 38 and turn sign 37 shown in FIG. 2A, the score display data corresponding to the data structure shown in FIG. 2B is generated.

Figure 3:
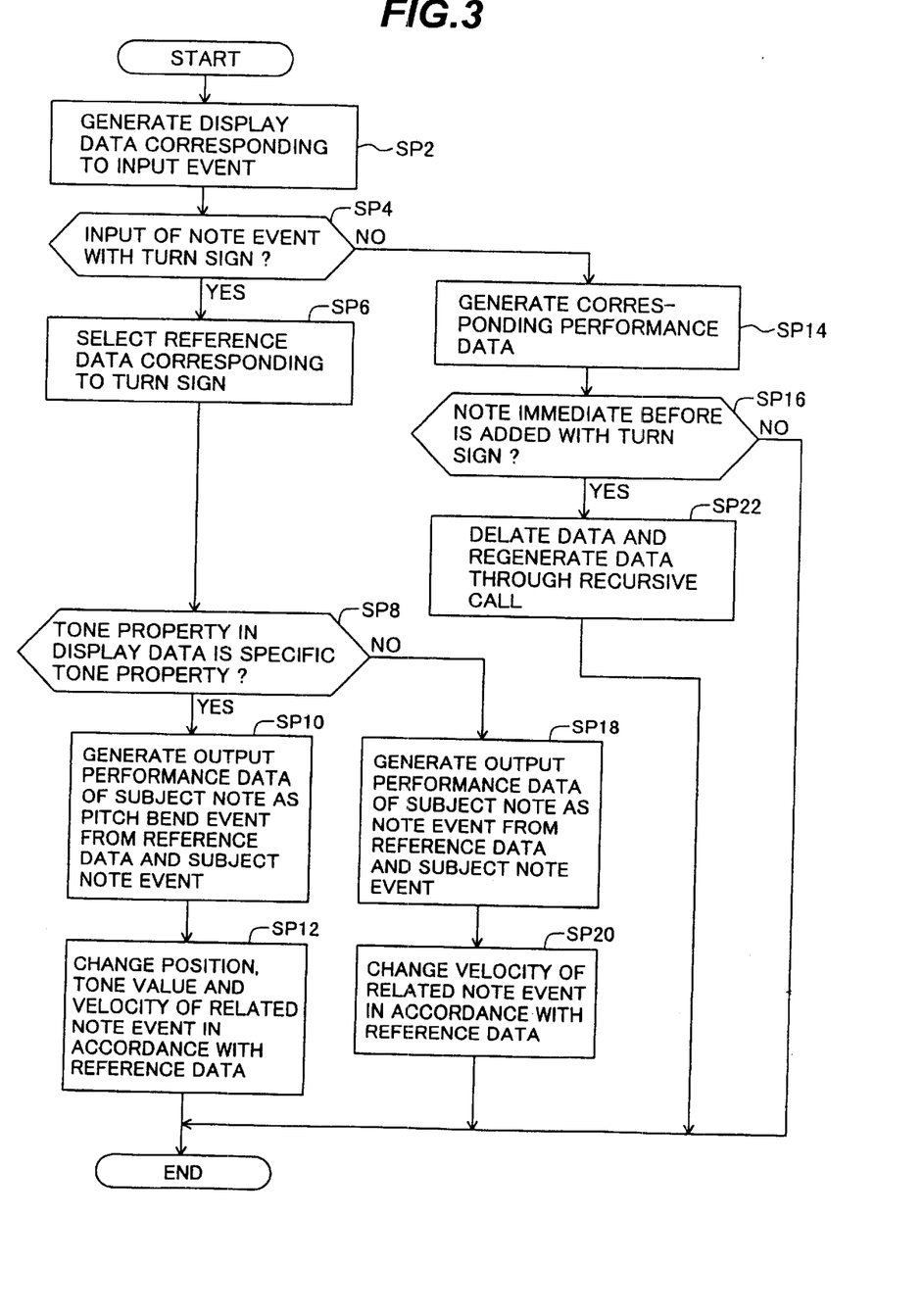
FIG. 3 is a flow chart illustrating the process to be executed by a performance data modifying and editing program.

When a new note is added to the score or a musical sign is added to an already existing note, by a user, while the score editing program runs, the performance data editing and modifying program illustrated in FIG. 3 is activated. Referring to FIG. 3, as the process advances to Step SP2, the note event data, musical sign data and the like of the score display data (FIG. 2B) corresponding to each input event are generated. At the next Step SP4 it is checked whether the input event is an input of a note event with a turn sign. The "note event with a turn sign" includes two cases, one being a new addition of a note with a turn sign and the other being an addition of a turn sign to an already existing note.

If the input event is not a note with a turn sign, it is judged at this Step SP4 as "NO" to thereby advance to Step SP14 whereat output performance data corresponding to the note is generated. For example, if a new note (without a turn sign) is inserted into the score, timing data and note event data corresponding to the note are inserted at Step SP2 in the score display data, and the contents same as the inserted timing data and note event data are inserted into the output performance data. At the next Step SP16, it is checked whether the newly inserted note is positioned on the score immediately after the note with a turn sign. If it is judged as "NO", the process of this routine is terminated.

Next, a process to be executed when a note with a turn sign is input will be described. For example, this process corresponds to the case that the quarter note 36 and turn sign 37 are inserted into the score immediately before the already existing quarter note 38 shown in FIG. 2A. In this case, at Step SP2, corresponding note event data and sign data are generated and thereafter at Step SP4 it is judged as "YES" to thereby advance to Step SP6. At Step SP6, the reference data (FIG. 4) corresponding to the turn sign is selected to be used for generating output performance data.

At the next Step SP8, the tone property designating field 31 in the score display data is referred to and it is checked whether or not the tone property corresponds to a "specific tone property". Although the specific tone property can be designated by a user as desired, it is preferable that a tone property of a continuous sound instrument of a single melody such as a clarinet is set to the specific tone property.

The reason why the process is branched depending upon the tone property will be described.

The reference data shown in FIG. 4 is represented by a note event. Therefore, this reference data can be properly used for the tone property such as a piano which requires to generate a new event each time the pitch changes. On the other hand, there is the case wherein an expression such as a turn rendering becomes more effective (capable of generating tone signals nearer to a natural musical instrument) by using pitch events (musical interval change events) rather than by using note events, depending upon the tone property. This case corresponds to a continuous sound instrument and the like of a single melody such as a clarinet. In this embodiment, therefore, the process is branched in accordance with the contents in the tone property designating field 31.

If the contents in the tone property designating field 31 do not correspond to the "specific tone property", it is judged at Step SP8 as "NO" to thereby branch to Step SP18. At this Step SP18, a note event is generated as the output performance data corresponding to the note with the turn sign, in accordance with the reference data and the note event data with the turn sign. As described earlier, since the reference data is generated for the representative note, the contents developed in accordance with the real scale and the subject note event data and sign data of the real score display data are added to the output performance data as the note event data 104, 108, . . . and timing data 106, 110, . . . .

First, the timing data 70, 74, . . . in the subject note data field 64 and the note value data 92 in the note event fields 72, 76, . . . are expanded/contracted in accordance with a ratio of the tone value (quarter note) of the representative note to the tone value of the subject note event. For example, if the tone value of the subject note event is a half note, the data is expanded by a twofold, whereas if the tone value of the subject note event is an eighth note, the data is contracted by a half.

Next, the pitch data 90 in the note event fields 72, 76, . . . is shifted in accordance with the scale set to the data setting field 30 and the pitch of the subject note event. Since the contents in the subject note data field 64 correspond to "quarter note at pitch of C4 in the key of C major", the middle tone for the turn rendering is "C4", the upper tone is "D4" and the lower tone is "B3". Since the score shown in FIG. 2A is the key of A major and the pitch of the subject note 36 is G4#, the pitch is shifted so that the generated output performance data has the middle tone of "G4#", upper tone of "A4" and lower tone of "F4#".

At the next Step SP20, in accordance with the related note data 66 in the reference data, the contents of the event (in the note event field 122 corresponding to the quarter note 38) of the related note in the output performance data are changed. As described earlier, in the related note data field 66 for the turn sign, valid data is stored only in the "velocity" field and invalid data is stored in the other fields. Therefore, the "velocity" data in the note event field 82 of the reference data (FIG. 4) is written in the "velocity field" in the note event field 122 of the output performance data. In this manner, the velocity of the quarter note 38 is set slightly lower than that of an ordinary note so that it is possible to realize the phenomenon that a key depression force for the note immediately after the note for the turn rendering such as an acoustic piano is weakened.

If the contents in the tone property designating field 31 correspond to the "specific tone property", the judgement process of "YES" at Step SP8 is followed by Step SP10. At this Step SP10, the output performance data for the note with a turn sign is generated as a pitch bend event in accordance with the reference data and the note event data with the turn sign. The timing when each pitch event is generated in the "case other than the specific tone property", is the same as the timing when each note event data 104, 108, . . . is generated. Therefore, the timing data 106, 110, . . . for the specific tone property has the same contents.

In the case of the specific tone property, instead of the note event data 104, 108, . . . shown in FIG. 5, the pitch event data is inserted into the output performance data. In this manner, a "resultant pitch" subjected to pitch-bend by each pitch bend event is specified. The "resultant pitch" is specified by a process similar to that described at Step SP18 because the pitch is the same as that of the note event data 104, 108, . . . generated in the "case other than the specific tone property".

However, since the pitch event indicates an amount of bend relative to the pitch without pitch bend (called non-bend pitch), it is necessary to specify this non-bend pitch before the contents of the pitch bend event are specified. In this embodiment, therefore, the pitch (B4) of the quarter note 38 of the related note is used as the non-bend pitch, and in accordance with a difference between the non-bend pitch and the "resultant pitch" subjected to the pitch bend, the pitch bend event is generated. Specifically, each pitch bend event is set having such contents as the pitches "G4#, A4, G4#, F4# and G4#" are sequentially generated for the non-bend pitch "B4" and the pitch bend is finally reset.

At the next Step SP12, the position, tone value and velocity of the related note event are changed. The velocity is changed in a manner similar to the "case other than the specific tone property". Namely, the velocity data in the note event field 122 is changed in accordance with the velocity data in the note event field 82. In the "case of the specific tone property", the position of the output performance data of the related note is set so that it positions before the subject note. In the example shown in FIG. 5, the note event field 122 is moved to between the timing data field 102 and the pitch bend event field replaced by the note event field 104. At Step SP12, the tone value in the note event field 122 of the related note is changed so that the tone value becomes equal to the total sum of the tone values of the original subject note and related note. Namely, in the example shown in FIG. 2A, the contents of the note event field 122 are set as if a half note at a pitch of B4 exists in place of the quarter notes 36 and 38.

As the output performance data generated in the above manner is reproduced, although a tone signal at the pitch "B4" is first synthesized in accordance with the note event data 122, the pitch is immediately changed thereafter to "G4#" by the pitch bend event data replaced by the note event data 104. Therefore, the sound at the pitch "G4#" is listened as if it is reproduced from the beginning. By the succeeding pitch bend events, the pitches are sequentially changed in the order of "A4, G4#, F4#, and G4#", and the pitch bend event is finally reset so that the pitch returns to the non-bend pitch "B4". Reproduction at the pitch "B4" continues for the remaining time of the "tone value corresponding to the half note" (i.e., corresponding to a quarter note). The resultant tone signals obtained have therefore the contents same as the score shown in FIG. 2A.

The reason why the pitch of the related note immediately after the subject note is used as the non-bend pitch is as in the following. The pitch bend event once generated is valid until data for resetting the pitch bend event is generated thereafter. When the pitch bend event is generated in response to a turn sign, it is arranged so that the reset data is to be finally generated. It is therefore possible to prevent succeeding data from being influenced by the pitch bend event.

If the newly inserted note is positioned immediately after the note with the turn sign, the judgement process of "YES" at Step SP16 is followed by Step SP22. This case corresponds, for example, to that a quarter note at a pitch of A4 is inserted between the quarter notes 36 and 38 shown in FIG. 2A. In this case, the score display data and output performance data of the quarter notes 36 and 38 and turn sign 37 are once deleted. Thereafter, the performance data editing and modifying program is recursively called to sequentially insert "a quarter note 38", "a quarter note at a pitch of A4" and "a quarter note 36 and a turn sign 37" into the score.

As this program is recursively called, first the output performance data for the quarter note 38 is generated at Step S14. Next, the recursively called program generates the output performance data for the quarter note at the pitch of A4. Then, the recursively called program executes Steps SP10 and SP12 or Steps SP18 and SP20 for the quarter note 36 and turn sign 37 by using the quarter note 36 as the subject note and the quarter note at the pitch of A4 as the related note. In this manner, the output performance data is generated for the score inserted with the quarter note at the pitch of A4.

The invention is not limited only to the embodiment described above, but various modifications are possible as in the following.

First, a method of generating output performance data which differs depending upon each tone property will be described.

In the above embodiment, the output performance data for the specific tone property is generated by executing a conversion process in accordance with the contents of the reference data. Instead, reference data for each tone property may be prepared beforehand and the reference data to be used is searched by using both the tone property and musical sign.

In this case, subject tone property data as well as the subject sign data of the reference data are stored. Performance data in the reference data corresponding to the tone property such as that of a clarinet is stored as a pitch bend event, and performance data in the reference data corresponding to other tone properties is stored as a note event (similar to the embodiment).

Further, although the note positioned immediately after the subject note in a score is used as the related note in the embodiment, an arbitrary note positioned immediately before the subject note or at any location may be used as the related note in accordance with each reference data. In the former case, data for controlling the note immediately before the subject note is stored as the reference data. A plurality of related notes such as immediately before and after the subject note may be used as the related notes.

Still further, although the invention is applied to an application program of a personal computer in the embodiment, the invention may be embodied by using a system having various discrete apparatus connected by a communication means such as MIDI and various networks.

The invention is applicable to an electronic musical instrument having a built-in tone generator, automatic performance apparatus and the like (of a keyed instrument type, a stringed instrument type, a wind instrument type, a percussion instrument type, and the like). When the invention is applied to such apparatus, the operating system and various application programs may be stored in ROM 17 to be directly executed by CPU 18.

Further, the format of performance data is not limited only to those used by the embodiment. For example, the format of performance data may be any type such as "event+relative time" which uses a lapsed time from the event one event before the present event as the occurrence time of a performance event, "event+absolute time" which uses an absolute time in a program or measure as the occurrence time of a performance event, "pitch (rest)+absolute time" which uses a tone pitch and length or a rest and length for representing performance data, and "direct format" which provides a memory area of each set of performance data in the minimum performance resolution unit and stores the performance data in the memory area corresponding to the occurrence time of the performance event. Performance data is not limited only to the type that the data is classified into each track (transmission channel), but the type that data of tracks may be mixed is also applicable.

In the embodiment, although it is assumed that the application program is stored in advance in the external storage unit 15 or the like, it may be downloaded via the communication network 24. Specifically, a server storing various programs and data may be connected to the communication network 24, and the programs and data are be downloaded from this server if they are not stored in the external storage unit 15 or the like. In this case, the performance data editing apparatus of the embodiment is a client and transmits a command of requesting to download programs and data to the server via the communication interface 14 and communication network 24. Upon reception of this command, the server distributes the requested programs and data to the apparatus via the communication network 24. The apparatus receives the programs and data via the communication interface 14, and stores them in the external storage unit 15 to thereby complete download.

In this embodiment, the output performance data corresponding to the turn sign is generated by referring to the reference data (FIG. 4). This process may be performed without using the reference data. The subject note may be divided into equal five parts in time, and the timing at each border between parts is shifted backward and forward slightly. The intensity of a velocity may be set by using random numbers. In this case, it is preferable that the middle tone is set relatively strong and the upper and lower tones are set relatively weak. With such random changes, output performance data to be generated for a plurality of turn sign can be given fine changes so that monotonous tones can be avoided.

In the above embodiment, data for a turn sign is used for the reference data by way of example. Instead, output performance data may also be generated by using reference data corresponding to a musical sign other than the turn sign. In the embodiment, only the velocity of the related note is changed in accordance with the turn sign. It is obvious that depending upon the kind of a musical sign, valid data for the timing data 80 in the related note data field 66, the pitch and tone value data in the note event data field 82 and the like may be stored when necessary to reflect this valid data upon the output performance data.

In the embodiment, the subject note data field 64 and related note data field 66 of the reference data are distinguished by storage field. They may be distinguished by using identifiers. For example, in the reference data, TextMetaEvent indicating that "the following storage field is the related note data field 66" may be inserted immediately after the subject note data field 64.

The present invention has been described in connection with the preferred embodiments. The invention is not limited only to the above embodiments. It is apparent that various modifications, improvements, combinations, and the like can be made by those skilled in the art.

What is claimed is:

1. A performance data modifying method for modifying performance data for reproducing musical tone generated from contents of a musical score, comprising the steps of:
    (a) adding a musical sign to a first note in the score;
    (b) modifying performance data for the first note and a second note positioned before or after the first note in the score, in accordance with the musical sign; and
    (c) reproducing musical tone in accordance with the modified performance data.

2. A performance data modifying method according to claim 1, further comprising:
    (d) reading step for reading reference data defining the performance data for the first and second notes from a memory,
    wherein said modifying step (b) modifies the performance data in accordance with said reference data read at said reading step (d).

3. A performance data modifying method according to claim 1, wherein said performance data contains tone property defining data for defining a tone property, and contents to be modified at said modifying step (b) change with said tone property defining data.

4. A performance data modifying method according to claim 1, further comprising the step of:
    (e) regenerating the performance data for the first and second notes when a third note is inserted between the first and second notes.

5. A performance data modifying method according to claim 1, wherein said musical sign is a turn sign.

6. A performance data modifying method for modifying performance data for reproducing musical tone generated from contents of a musical score, comprising the steps of:
    (a) inserting a first note added with a musical sign into the score;
    (b) modifying performance data for the first note and a second note positioned before or after the first note in the score, in accordance with the musical sign; and
    (c) reproducing musical tone in accordance with the modified performance data.

7. A performance data modifying method according to claim 6, further comprising:
    (d) reading step for reading reference data defining the performance data for the first and second notes from a memory,
    wherein said modifying step (b) modifies the performance data in accordance with said reference data read at said reading step (d).

8. A performance data modifying method according to claim 6, wherein said performance data contains tone property defining data for defining a tone property, and contents to be modified at said modifying step (b) change with said tone property defining data.

9. A performance data modifying method according to claim 6, further comprising the step of:
    (e) regenerating the performance data for the first and second notes when a third note is inserted between the first and second notes.

10. A performance data modifying method according to claim 6, wherein said musical sign is a turn sign.

11. A performance data modifying method for modifying performance data for reproducing musical tone generated from contents of a musical score, comprising the steps of:
    (a) inserting a second note before or after a first note added with a musical sign into the score;
    (b) modifying performance data for the first note and a second note positioned before or after the first note in the score, in accordance with the musical sign; and
    (c) reproducing musical tone in accordance with the modified performance data.

12. A performance data modifying method according to claim 11, further comprising the step of:
    (d) regenerating the performance data for the first and second notes when a third note is inserted between the first and second notes.

13. A performance data modifying method according to claim 11, wherein said musical sign is a turn sign.

14. A performance data modifying apparatus for modifying performance data for reproducing musical tone generated from contents of a musical score, comprising:
    an adding device that adds a musical sign to a first note in the score;
    a modifying device that modifies performance data for the first note and a second note positioned before or after the first note in the score, in accordance with the musical sign; and
    a reproducer that reproduces musical tone in accordance with the modified performance data.

15. A performance data modifying apparatus for modifying performance data for reproducing musical tone generated from contents of a musical score, comprising:
    an inserting device that inserts a first note added with a musical sign into the score;
    a modifying device that modifies performance data for the first note and a second note positioned before or after the first note in the score, in accordance with the musical sign; and
    a reproducer that reproduces musical tone in accordance with the modified performance data.

16. A performance data modifying apparatus for modifying performance data for reproducing musical tone generated from contents of a musical score, comprising:
    an inserting device that inserts a second note before or after a first note added with a musical sign into the score;
    a modifying device that modifies performance data for the first note and a second note positioned before or after the first note in the score, in accordance with the musical sign; and
    a reproducer that reproduces musical tone in accordance with the modified performance data.

17. A storage medium storing a program for executing to realize a performance data modifying process for modifying performance data for reproducing musical tone generated from contents of a musical score, comprising the steps of:
    (a) adding a musical sign to a first note in the score;
    (b) modifying performance data for the first note and a second note positioned before or after the first note in the score, in accordance with the musical sign; and (c) reproducing musical tone in accordance with the modified performance data.

18. A storage medium storing a program for executing to realize a performance data modifying process for modifying performance data for reproducing musical tone generated from contents of a musical score, comprising the steps of:

(a) inserting a first note added with a musical sign into the score;

(b) modifying performance data for the first note and a second note positioned before or after the first note in the score, in accordance with the musical sign; and (c) reproducing musical tone in accordance with the modified performance data.

19. A storage medium storing a program for executing to realize a performance data modifying process for modifying performance data for reproducing musical tone generated from contents of a musical score, comprising the steps of:

(a) inserting a second note before or after a first note to which a musical sign has been added;

(b) modifying performance data for the first note and a second note positioned before or after the first note in the score, in accordance with the musical sign; and (c) reproducing musical tone in accordance with the modified performance data.

\* \* \* \* \*